United States Patent [19]
Kim et al.

[11] Patent Number: 6,035,361
[45] Date of Patent: Mar. 7, 2000

[54] CELL BUS ARBITRATION DEVICE AND METHOD ARBITRATING THE SAME

[75] Inventors: Do Young Kim; Sang Joong Kim, both of Daejeon, Rep. of Korea

[73] Assignees: Electronics and Telecommunications Research Institute, Daejeon; Korea & Telecom, Seoul, both of Rep. of Korea

[21] Appl. No.: 09/121,166

[22] Filed: Jul. 23, 1998

[30] Foreign Application Priority Data

Nov. 28, 1997 [KR] Rep. of Korea ............. 97-64106

[51] Int. Cl.⁷ .................................. G06F 13/364
[52] U.S. Cl. .................... 710/113; 710/113; 710/120; 710/244
[58] Field of Search .................... 710/111, 113, 710/116, 119, 120, 122, 123, 240–244, 107

[56] References Cited

U.S. PATENT DOCUMENTS

| | | | |
|---|---|---|---|
| 4,009,470 | 2/1977 | Danilenko et al. | 340/172.5 |
| 4,536,839 | 8/1985 | Shah et al. | 364/200 |
| 4,760,515 | 7/1988 | Malmquist et al. | 364/200 |
| 5,440,698 | 8/1995 | Sindhu et al. | 395/200 |
| 5,481,680 | 1/1996 | Larson et al. | 710/112 |
| 5,519,837 | 5/1996 | Tran | 710/111 |
| 5,689,656 | 11/1997 | Baden et al. | 710/116 |
| 5,729,702 | 3/1998 | Creedon et al. | 710/111 |
| 5,832,278 | 11/1998 | Pham | 710/243 |
| 5,857,108 | 1/1999 | Hong | 710/260 |
| 5,915,102 | 6/1999 | Chin | 710/113 |

*Primary Examiner*—Ayaz R. Sheikh
*Assistant Examiner*—Raymond N Phan
*Attorney, Agent, or Firm*—Cohen, Pontani, Lieberman & Pavane

[57] ABSTRACT

A cell bus arbitration device and method arbitrating a cell bus transmitting data in a certain size of packet unit is disclosed. The cell bus arbitration device comprises a filter for outputting request signals not to be masked by using service mask data, a decoder for outputting only the highest priority request signal, a latching and counting unit latching and counting the priority signal, a service flag for outputting service mask data according to the bus grant signals, and a detector for detecting the state of the bus request signals and controlling the service flag unit. The device is used for arbitrating a cell bus for transmitting data in packet unit.

3 Claims, 4 Drawing Sheets

FIG. 2A  
FIG. 2B
FIG. 2C
FIG. 2D
FIG. 2E
FIG. 2F
FIG. 2G

CELL BUS ARBITRATION DEVICE AND METHOD ARBITRATING THE SAME

BACKGROUND OF THE INVENTION

1. Field of the Invention

The present invention relates to a device and a method of arbitrating a cell bus for transmitting data in a certain size of packet unit, and more particularly, to a cell bus arbitration device and method of allowing the right to use a cell bus effectively to multiple service entities in the cell bus, in which the multiple service entities are connected in parallel, and of arbitrating the cell bus by first-in-first-out function and service use records.

2. Description of the Prior Art

In the priority art, the conventional methods arbitrating a cell bus are classified according to the following three types: firstly, a method by daisy chain representing the method being used in a VME bus of Motorola; secondly, a distributed bus arbitration method; and, thirdly, a full-connected-bus arbitration method (Refer to "Advanced Computer Architecture" by Kai Hwang).

The method by daisy chain arbitrates a bus by that multiple entities connected a common bus share and request a bus request line, and connect bus acceptance signals from a bus arbiter by daisy chain.

The distributed-bus arbitration method is that each entity has its inherent ID and supplies the ID according to the request of a bus, but a entity having a low-valued ID has the right using the bus before others at the collision of IDs.

The full-connected-bus arbitration method is that each entity has separately a bus arbiter, a bus request signal and a bus use signal line, and bus arbitration is accomplished by multiple algorithms in the bus arbiter.

However, among the bus arbitration devices in the conventional full-connected-bus arbitration method as described in the above, there is a problem which it is impossible to allow the uniform right to use a bus to all entities because the first-in-first-out function having been used until now is applied simply and a entity requesting use of the bus frequently over-occupies the bus one-sidedly.

SUMMARY OF THE INVENTION

It is another object of the present invention to provide a consequence of improvement of the simple first-in-first-out mode in the first-in-first-out method using a bus arbiter adopted mostly by the conventional art, and giving a uniform bus arbitration service to multiple service entities by using a service flag displaying a additional service.

It is another object of the present invention to provide a cell bus arbitration device and method for performing the basic function of the first-in-first-out method for the multiple service entities to transmit and receive data through a bus connected in parallel, where the address data of a transmitter and a receiver are included in the content of a packet and the data high-speed transmission of one to one and one to N (N is any group or all the members) is possible.

The cell bus arbitration device of the present invention includes filtering means for outputting request signals not to be masked by using service mask data made from bus request signals inputted from outside; decoding means for decoding the output signals from the filtering means and outputting only the highest priority request signal according to the pre-designated priority; latching and counting means for latching the priority signal in order to maintain the bus use signals in a certain time duration for the priority bus request signal outputted from the decoding means and outputting bus grant signals by counting the priority signal according to a clock signal applied from outside; service flag means for maintaining bus use records for a certain service entity and outputting data maintained according to the bus grant signals into the filtering means in the form of service mask data; and detecting means for detecting the state of the bus request signals according to the bus grant signals and controlling the above service flag means.

According to a present invention, a method of arbitrating a cell bus for transmitting data in a certain size of packet unit comprises the steps of inactivating all bus grant signals by initializing by a reset signal; deciding whether there are effective bus request signals by sampling bus request signals transmitted from multiple service entities; deciding whether the bus is busy by using bus busy signals if there are the effective bus request signals as the result of decision in the deciding step; outputting only bus request signals not to be masked by using the relevant service mask signal if it is decided that use of the bus is ended as a result of decision in the bus busy deciding step; outputting only the highest priority bus request signal according to the pre-designated priority among the signals outputted in the bus request signal outputting step; and latching the priority signal in order to maintain the bus use signals in a certain section for the highest priority bus request signals outputted in the highest priority bus request signal outputting step and counting the priority signal in order to maintain the bus grant signal in the active state during a clock cycle that the service entity occupies a bus and uses it for data transmission.

The present invention puts a service flag on a service coordinator and masks the relevant service flag for a service entity used a bus once, but gives a first-in-first-out bus arbitration means of service recording type which deletes the use record and allow the right to use the bus to the service entity if other entities do not request to use the bus when the service entity requests the bus again. Also, the present invention assumes for the convenience of explanation that multiple service entities compete each other in order to request and authorize use of a bus in parallel.

Therefore, if a service entity among multiple entities requests use of a bus and uses the bus, but if there are requests to use the bus by other service entities during occupancy by the service entity or before the end of occupancy, the right to use the bus will be not allowed to the service entity till other service entities use bus according the priority sequence. On the contrary, if there is not any request by other service entities during occupancy by the service entity or before the end of occupancy, the use record of the service entity is deleted and the right to use the bus is given to the all service entities.

BRIEF DESCRIPTION OF THE DRAWINGS

Still other advantages and features of the present invention will become apparent when the following detailed description is read in conjunction with the attached drawings, in which:

FIG. 2 illustrates a timing diagram of a cell arbitration device shown in FIG. 1;

DETAILED DESCRIPTION OF THE PREFERRED EMBODIMENTS

Figure 1:
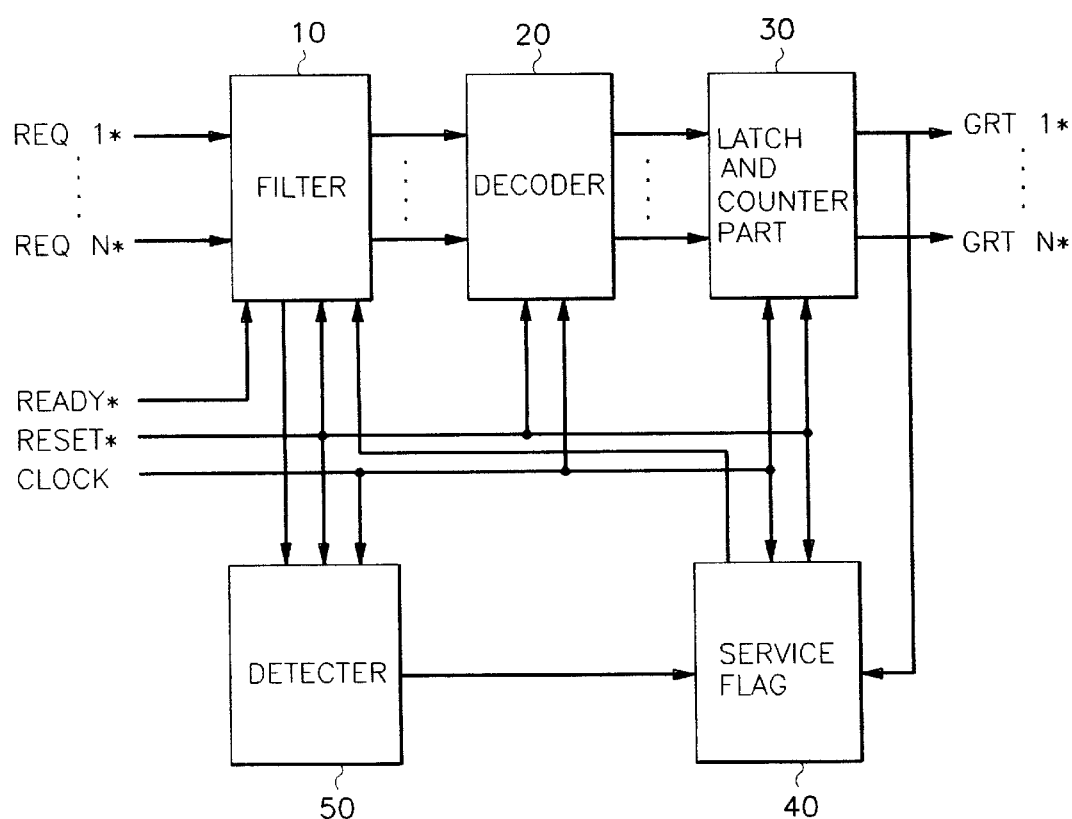
FIG. 1 illustrates a block diagram of a cell bus arbitration device according to the present invention.

FIG. 1 illustrates a block diagram of a cell bus arbitration device according to the present invention. In FIG. 1, the cell arbitration device of the present invention includes a filter 10 outputting request signals not to be masked by using mask data transmitted, a decoder 20 outputting only the highest priority request signal by decoding output signals from the filter 10, a latch and counter part 30 latching and counting the priority request outputted from the decoder 20, a service flag 40 outputting service data in the form of mask data into the filtering means, and detector 50 detecting the state of the bus request signal and controlling the service flag 40.

The detailed explanation of a cell bus arbitration device will now be described with reference to FIG. 1.

Assume that bus request signals from each service entity are REQ1, ~, REQN* and bus grant signals for the request signals are GRT1*, ~, GRTN*. Also that multiple service entities are connected a bus. Here, the indication * means that each signal is activated in negative logic.

Filter 10 inputs bus request signals REQ1, ~, REQN* transmitted from each service entity and outputs only bus request signals not to be masked by using mask signals transmitted from a service flag 40. Here, the service flag 40 outputs the service signals only if a ready signal READY* is activated and a reset signal RESET* is inactivated. The ready signal READY* is inputted from the state data of the buffer (not illustrated) in the input direction and is activated ordinarily when there is at least a empty memory space of fifty-three bytes.

Decoder 20 outputs only a bus request signal having the highest priority according to the pre-designated priority among the output signals from filter 10. It is embodied by using a general priority decoder logic.

Latch and counter part 30 latches the priority signal in order to maintain the bus use signals in a certain time for the priority bus request signal outputted from the decoder 20 and outputs bus grant signals GRT1*, ~, GRTN* being used for data transmission in a certain clock cycle into a common bus signal line and service flag 40 by counting the priority signal.

Service flag 40 performs to maintain bus use records for a certain service entity and outputs the data into the filter 10 in the form of service mask data. Also, the service flag 40 is controlled by no request signals transmitted from the detector 50 and thereby performs to erase the mask data. Besides, it is possible to add selectively function to give priority in integer counters to a certain channel among 1~N in the service Flag 40.

When a counter is fixed for occurrence of a service mask for a certain channel and the counter value reaches zero by decreasing the pre-fixed counter one by one at service execution time, the service flag 40 outputs the service mask for the applied channel and thereby it is easy to maintain service control uniformity which is difficult to accomplish in the conventional art and to perform priority designation considering the character of service traffic.

Detector 50 detects the state of the bus request signals REQ1*, ~, REQN* when the bus grant signals GRT1*, ~, GRTN* are ended. Detector 50 makes the service flag 40 to maintain service records continuously if the detected bus request signals REQ1*, ~, REQN* are activated but, on the contrary, detector 50 makes the service flag 40 to delete the service records if the detected bus request signals REQ1*, ~, REQN* are inactivated.

On the other hand, it is possible to increase or to decrease service entities connected a bus.

FIGS. 2A to 2G illustrate a timing diagram of a cell arbitration device shown in FIG. 1.

FIG. 2A shows the timing of clocks inputted to a filter 20, a decoder 20, a latch and counter part 30, a service flag 40 and a detector 50, FIG. 2B shows the timing of a bus request signal REQ1* inputted from a service entity to the filter 10, FIG. 2C shows the timing of a bus request signal REQ2* inputted from a service entity to the filter 10, FIG. 2D shows the timing of a bus grant signal GRT1* transmitted from the latch and counter part 30 to the service flag 40, FIG. 2E shows the timing of a bus grant signal GRT2* transmitted from the latch and counter part 30 to the service flag 40, FIG. 2F shows the timing of a service mask that the service flag 40 inputs the bus grant signal GRT1* and outputs it to the filter 10, and FIG. 2G shows the timing of a service mask that the service flag 40 inputs the bus grant signal GRT2* and outputs it to the filter 10.

Figure 3:
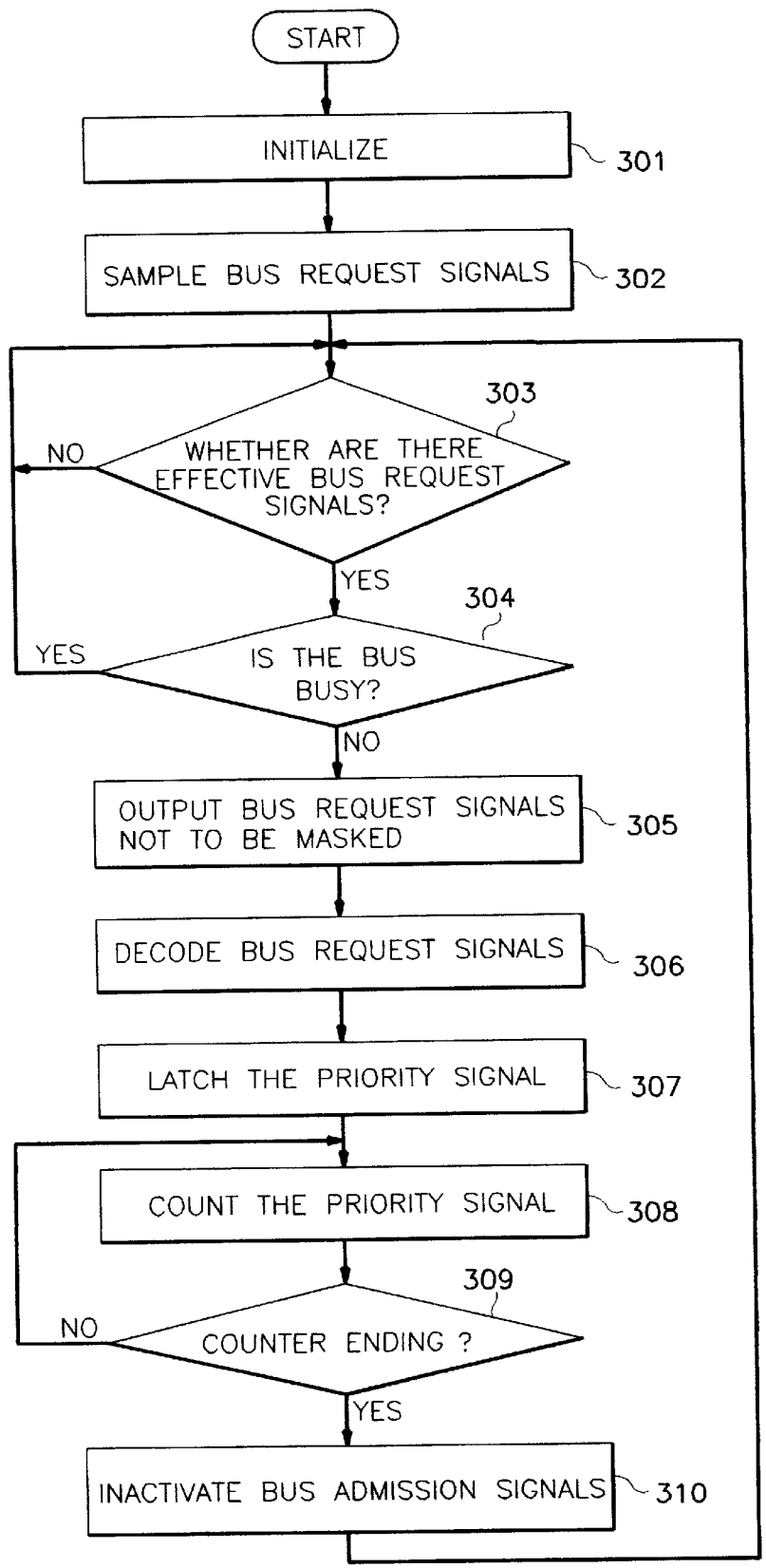
FIG. 3 illustrates a flow chart of showing the action course of a cell bus arbitration method according to the present invention.

FIG. 3 illustrates a flow chart showing the execution procedure of a cell bus arbitration method according to the present invention.

As shown in FIG. 3, a latch and counter part 30 is initialized by reset signals, and inactivates a detector 50 by inactivating all bus grant signals. Filter part 10 samples 302 bus request signals transmitted from multiple service entities on the edge of clock and thereby decides 303 whether there is a valid signals. As a result of the decision, if there is no bus request signal, the filter part 10 performs the decision course 303 continuously.

If there are valid bus request signals in the decision course 303, the filter part 10 decides 304 whether the bus is busy by using bus busy signals transmitted from a service flag 40. If it is decided that the bus is busy as a result of the above decision, the filter part 10 perform the above decision course 303 again while waiting for ending of use of the bus.

If use of the bus is ended in the above decision course 304, the filter part 10 outputs 305 bus request signals not to be masked into decoder 20 by using the applied service mask data transmitted from the service flag 40 and the decoder 20 decodes signals transmitted the filter part 10 and outputs 306 only the highest priority bus request signal according to the pre-designated priority into the latch and counter part 30.

The latch and counter part 30 latches 307 the priority signal in order to maintain bus use signals in a certain section for the highest priority signal outputted from the decoder 20 and counts 308 the priority signal according to clock in order to maintain bus grant signals to be activated only for the clock's cycle that service entities occupies the bus and uses it for data transmission. The latch and counter part 30 decides 309 whether counting action ends. If it is decided to end counting action as the result of the decision, the latch and counter part 30 inactivates 310 the bus grant signal and performs the course 303 again. If it is decide to perform counting action continuously as the result of the decision course 309, the latch and counter part 30 performs the latching course of the priority signal 307 again.

Figure 4:
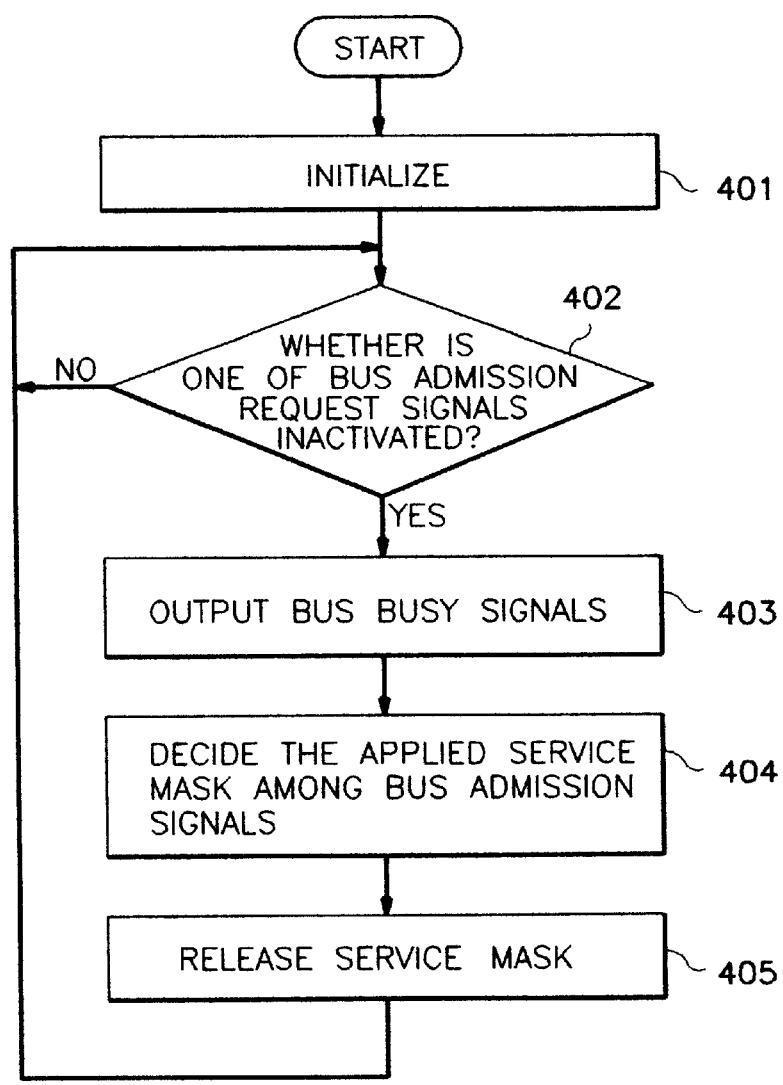
FIG. 4 illustrates a flow chart of showing the action of a service flag shown in FIG. 1.

FIG. 4 illustrates a flow chart showing in detail the action course of a service flag shown in FIG. 1.

As shown in FIG. 4, a reset signal RESET* inactivates 401 all service mask signals and bus busy signals, and service flag 40 decides 402 whether one of bus grant signals is activated. If it is decided that the bus grant signals are not in the active state as the result of the decision, the service flag 40 performs the decision course 402 continuously. If it is decided that one of bus grant signals activates in the decision course 402, the service flag 40 outputs 403 the bus busy signals into the filter part 10 by fixing an service mask of the applied channel. The service flag 40 decides 404 the applied service mask among the bus grant signals. If there is no any valid signal as the result of checking whether one of the bus grant signals become inactivated after activated and checking of input data regarding the existence of valid bus request signals inputted from the detector 50, the service flag 40 releases 404 the service mask of the applied channel and then performs the decision 402 again.

It is possible to give priority in integer counters to a certain service entity by adding a course deciding 404 the applied service mask in the service flag 40, and it is possible to be realized by fixing a counter for N of entities in the integer of the service flag 40.

For example, If the N service entity gives the right to occupy priority for use of bus to the N−1, N entities decrease the value one by one every four occupancies but it is possible to use the method outputting the applied service mask only if the value is to be zero. If the relative priority is to be one, the special decrease counter is not needed. If the N−1 entity occupies the bus one time, the N−1 entity has one-fourth bus occupancy right since the N−1 applied service mask is fixed.

As being described in the above, a cell bus arbitration device and method of the present invention has the following effects: firstly, it is possible to give the uniform service and to expect the quality of service having low delay according to each service in a network or a terminal executing communication of packet unit as Asynchronous Transfer Mode (ATM) network since the present invention accepts the bus occupancy requests of the service entities by the conventional first-in-first-out in a cell bus just like that and execute the bus request of the service entities through a bus in a service recording type even though the bus requests occur frequently; and, secondly, when the cell bus of the present invention should execute a special priority for a special service entity, it may executes the right of use of the bus in integer times for other entity by mounting a counter circuit on the inner part of a service flag and thereby it gives the priority adequately to several kinds of multiple service module having different data generation rates in a terminal unit or a server system and allocates the right of occupancy of the bus uniformly to them, so that the cell bus consequently has an effect making a service multiplexing function possible.

While the preferred embodiments have been described in the foregoing specification, the scope of the invention shall be defined with reference to the following claims.

What is claimed is:

1. A cell bus arbitration device, comprising:

filtering means for receiving bus request signals including service mask data from an external source and using the service mask data for outputting signals to remain unmasked;

decoding means for receiving and decoding the ouput signals from said filtering means and outputting a highest priority request signal according to a previously designated priority signal;

latching and counting means for latching the previously designated priority signal to maintain bus use signals in a certain section of time for the highest priority request signal from said decoding means and outputting bus grant signals by counting the priority signal in response to an external clock signal;

service flag means for receiving said bus grant signals, maintaining bus use records for a certain service entity, and outputting data maintained according to said bus grant signals in the form of said service mask data, and detecting means for detecting a status of the bus request signals in response to said bus grant signals and controlling said service flag means.

2. A method for arbitrating a cell bus for transmitting data in a certain size packet unit, comprising the steps of:

a. initializing a cell bus by inactivating all bus grant signals in response to a reset signal;

b. determining whether there are any effective bus request signals by sampling bus request signals transmitted from multiple service entities;

c. determining whether a bus is busy using bus busy signals if an effective bus request signal is determined in said step b.;

d. outputting only bus request signals to remain unmasked using a service mask signal if it is determined that use of the bus has ended in step c., and e. latching a priority signal to maintain the bus use signals in certain sections of time for the highest priority bus request signals outputted in step d. and counting the priority signal to maintain the bus grant signal in the active state during a clock cycle in which a service entity occupies the bus and uses it for data transmission.

3. The method of claim 2, wherein said step d. further comprises the steps of:

f. inactivating all service mask signals and bus busy signals:

g. determining whether one of the bus grant signals is activated;

h. outputting the bus busy signals and applying a service mask if an active bus grant signal is determined in said step g.;

i. determining the applied service mask among the bus grant signals;

j. checking whether one of the bus grant signals becomes inactivated after it is activated;

k. checking input data from an external source for the existence of valid bus request signals; and l. releasing the service mark if no valid signals are found after steps j. and k.

* * * * *